(12) United States Patent
Iemmers

(10) Patent No.: US 8,975,819 B2
(45) Date of Patent: Mar. 10, 2015

(54) LIGHT SENSOR DEVICE AND LIGHT CONTROL DEVICE

(75) Inventor: Johannes Hendrikus Maria Iemmers, Reek (NL)

(73) Assignee: Koninklijkle Philips N.V., Eindhoven (NL)

(*) Notice: Subject to any disclaimer, the term of this patent is extended or adjusted under 35 U.S.C. 154(b) by 591 days.

(21) Appl. No.: 12/993,274

(22) PCT Filed: May 25, 2009

(86) PCT No.: PCT/IB2009/052173
§ 371 (c)(1),
(2), (4) Date: Nov. 18, 2010

(87) PCT Pub. No.: WO2009/144652
PCT Pub. Date: Dec. 3, 2009

(65) Prior Publication Data
US 2011/0080100 A1 Apr. 7, 2011

(30) Foreign Application Priority Data
May 29, 2008 (EP) .................................. 08104156

(51) Int. Cl.
*H05B 41/36* (2006.01)
*H05B 37/02* (2006.01)

(52) U.S. Cl.
CPC ............. *H05B 37/0218* (2013.01); *Y02B 20/46* (2013.01)
USPC .......................................... 315/149; 315/150

(58) Field of Classification Search
CPC ............. H05B 37/029; H05B 37/0254; H05B 37/0218; H05B 39/042; H05B 41/3922; H05B 33/0803; H05B 33/0842; H05B 33/0854; H05B 33/0857; H05B 33/0863; H05B 37/0263; H05B 37/0281
USPC ...................... 315/149, 157, 291, 295, 185 R
See application file for complete search history.

(56) References Cited

U.S. PATENT DOCUMENTS

| 5,237,168 A | 8/1993 | Giust et al. | |
|---|---|---|---|
| 5,237,169 A | 8/1993 | Grehant | |
| 6,466,234 B1* | 10/2002 | Pyle et al. | 715/771 |
| 6,944,575 B2* | 9/2005 | Ueno et al. | 702/188 |
| 8,063,750 B2* | 11/2011 | Knibbe | 340/286.02 |
| 2006/0139922 A1* | 6/2006 | Diederiks et al. | 362/253 |

FOREIGN PATENT DOCUMENTS

| JP | 2002289373 A | 10/2002 |
|---|---|---|
| JP | 2005216534 A | 8/2005 |
| JP | 2006147183 A | 6/2006 |

(Continued)

*Primary Examiner* — Douglas W Owens
*Assistant Examiner* — Amy Yang
(74) *Attorney, Agent, or Firm* — Meenakshy Chakravorty

(57) ABSTRACT

Sensor devices (1) are provided with trigger signal generators (2) for repeatedly generating trigger signals and light detectors (12) for detecting light parameters such as intensities and colors and color temperatures and patterns and fluctuations of light (43) at a location and transmitters (9) for, in response to trigger signals, transmitting control signals based on detections to control devices (20) for controlling light sources (40) to influence the light (43) at the location. The sensor devices (1) may further comprise theme code generators (3), location code generators (4), processors (5), scanners (10), and position detectors (6). The control devices (20) comprise receivers (27) for receiving the control signals from the sensor devices (1) and controllers (26) for, in response to the control signals, controlling the light sources (40) and may further comprise theme code detectors (21) and/or processors (22) and/or location code detectors (23) and/or setting detectors (24) and/or communicators (28) for communication with scanners (10) and/or transmitters (29) and/or arbiters (25).

8 Claims, 1 Drawing Sheet

(56) References Cited

FOREIGN PATENT DOCUMENTS

| | | |
|---|---|---|
| JP | 2007035420 A | 2/2007 |
| WO | 2004072840 A1 | 8/2004 |
| WO | 2006111930 A2 | 10/2006 |
| WO | WO 2006111927 A1 * | 10/2006 |
| WO | WO 2006111930 A2 * | 10/2006 |
| WO | WO 2006111934 A1 * | 10/2006 |
| WO | 2007004097 A1 | 1/2007 |

* cited by examiner

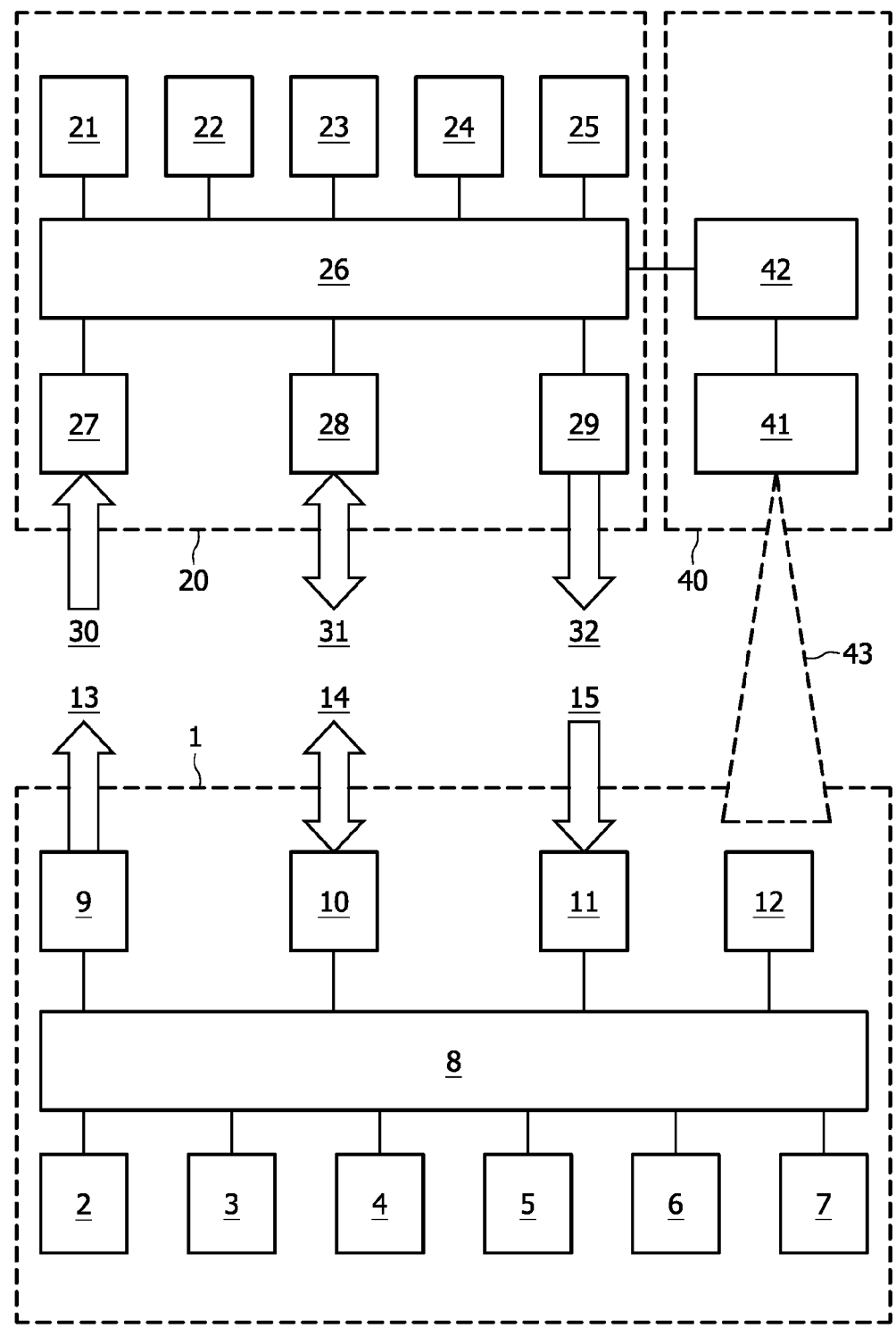

LIGHT SENSOR DEVICE AND LIGHT CONTROL DEVICE

FIELD OF THE INVENTION

The invention relates to a sensor device, and also relates to a control device for controlling a light source, to a method, to a computer program product and to a medium.

Examples of such a control device is a centralized control device for controlling two or more light sources or a decentralized control device for controlling one or more light sources.

BACKGROUND OF THE INVENTION

WO 2006/111930 discloses a sensor device that needs to be operated by a user all the time.

SUMMARY OF THE INVENTION

It is an object of the invention to provide a sensor device that does not need to be operated by a user all the time.

Further objects of the invention are to provide a control device, a method, a computer program product and a medium.

According to a first aspect of the invention, a sensor device is defined comprising a trigger signal generator for repeatedly generating trigger signals, a light detector for detecting a light parameter of light at a location, and a transmitter for, in response to a trigger signal, transmitting a control signal based on a detection to a control device for controlling a light source to influence the light at the location.

By having introduced a trigger signal generator and by letting a light detector detect a light parameter of light at a location and by letting a transmitter transmit a control signal in response to a trigger signal from the trigger signal generator, which control signal is based on a detection performed by the light detector, a sensor device has been created that does not need to be operated by a user all the time. The user can for example put the sensor device on a table and activate it and from that moment on the sensor device will act automatically and independently from the user.

The sensor device may get its power from a non-chargeable battery and/or from a chargeable battery and/or from a solar cell and/or from another power source. The trigger signal generator may be a clock signal generator or another signal generator. The repeated trigger signals may be repeated per fixed time-interval or flexible time-interval, whereby a time-interval may depend on the actual time or another time or on the environment or on other data. The trigger signal generator may itself be triggered via an internal or external signal. The light detector may be a light dependent resistor or a solar cell or another light detector. The transmitter may be a wireless transmitter using radio or optical signals or may be a wired transmitter using a wire, which wire might be used for further purposes such as power supply.

According to a first possibility, the transmitter may transmit in response to a trigger signal directly, whereby the light detector may act independently from such a trigger signal. According to a second possibility, the light detector may detect in response to a trigger signal directly, and the transmitter may transmit in response to a trigger signal indirectly, by transmitting in response to a detection result from the light detector. According to a third possibility, the light detector may detect a change in a light parameter, whereby the trigger signal generator will generate a trigger signal in case of said change being larger than a threshold etc.

According to an embodiment, the sensor device is defined by the sensor device being a mobile sensor device to be used temporarily at the location, the light at the location being light at the light detector, and the light parameter being an intensity and/or a color and/or a color temperature and/or a pattern and/or a fluctuation of the light. The word "temporarily" here means that the sensor device is used in a flexible and non-fixed way. In practice, it may stay for hours at one and the same location. In fact, it may even stay for days at one and the same location, or longer, if required by a user or in case there is a further light control mechanism that can overrule the sensor device, for example during non-working or sleeping time etc.

According to an embodiment, the sensor device is defined by the control signal comprising light parameter information defining the detected light parameter. In this case, most intelligence is located inside the control device, and the sensor device has an information function. So, in this case, the control signal is based on a detection from the light detector by having inserted the light parameter information into the control signal.

According to an embodiment, the sensor device is defined by further comprising a theme code generator for generating a theme code, the control signal comprising the theme code, the theme code being a fixed theme code or an adjustable theme code. The theme code defines a theme such as for example working, reading, relaxing, watching television, listening to the radio, being romantic, cleaning etc. (activity themes) or blue, green, red, dark, light, snow, desert, sea, autumn etc. (scenery themes). Each sensor device may have its own fixed theme code, or for example a user may be able to adjust the theme code, for example via a man-machine-interface. So, the theme code generator may be a generator for generating a fixed theme code or may form part of or comprise a man-machine-interface.

According to an embodiment, the sensor device is defined by further comprising a location code generator for generating a location code, the control signal comprising the location code, the location code being a calculated location code or an adjustable location code or an indicative location code. The calculated location code is either calculated in the sensor device at the hand of for example positioning system technology or mobile radio technology or an indication code originating from the control device or is calculated outside the sensor device and then supplied to the sensor device. The adjustable location code is for example selected by the user, for example via a man-machine-interface. The indicative location code is for example a fixed location code for a sensor device that is designed to be used at a particular location. So, the location code generator may form part of or comprise a positioning system or a receiver or may form part of or comprise a man-machine-interface or may be a generator for generating a fixed location code.

According to an embodiment, the sensor device is defined by further comprising a processor for, in response to a detection, calculating a setting for the control device, the control signal comprising the setting. In this case, most intelligence is located inside the sensor device, and the control device has a slave function. To be able to calculate the setting, the sensor device must have knowledge about the position of the light source. Such knowledge might be pre-stored in a memory coupled to the processor. So, in this case, the control signal is based on a detection from the light detector by having inserted a setting into the control signal, which setting is calculated in response to a detection of a light parameter.

According to an embodiment, the sensor device is defined by further comprising a scanner for scanning an environment for available light sources. Via the scanner, the knowledge about the position of the light source no longer needs to be pre-stored in the memory but may be retrieved on the fly. Thereto, any kind of communication mechanism between the sensor device and one or more of the control device and the light source might be used.

According to a first possibility, the scanner is a passive scanner that receives scanning information from the control device and/or the available and/or reachable light sources. According to a second possibility, the scanner is an active scanner that sends scanning requests to and receives scanning responses from the control device and/or the available and/or reachable light sources. According to a third possibility, the scanner is a testing scanner that scans the environment through tests and/or trial & error (what happens if for example a first light source is ordered to increase its intensity by for example 10% and a second light source is ordered to decrease its intensity by for example 10%) etc.

According to an embodiment, the sensor device is defined by further comprising a position detector for activating and deactivating the transmitter in dependence of a position of the sensor device. The sensor device may for example be in the form of a match box or a cube etc. In a first position it functions as a sensor device and in a second position such as up-side-down it does not function as a sensor device.

According to a second aspect of the invention, a control device for controlling a light source to influence light at a location is defined by the control device comprising a receiver for receiving a control signal from a sensor device, and a controller for, in response to the control signal, controlling the light source, the control device further comprising at least one of four parts, a first part comprising a theme code detector for detecting a theme code, the control signal comprising the theme code, and comprising a processor for, in response to a detection, calculating a setting for the light source, a second part comprising a location code detector for detecting a location code, the control signal comprising the location code, and comprising a processor for, in response to a detection, calculating a setting for the light source, a third part comprising a setting detector for detecting a setting for the light source, the control signal comprising the setting, a fourth part comprising a communicator for communication with a scanner of the sensor device.

According to an embodiment, the control device is defined by the control signal comprising light parameter information defining a light parameter detected by the sensor device, the light parameter being an intensity and/or a color and/or a color temperature and/or a pattern and/or a fluctuation of the light.

According to an embodiment, the control device is defined by further comprising a transmitter for transmitting an indication code to the sensor device.

According to an embodiment, the control device is defined by further comprising an arbiter for making a decision in case the control signal from the sensor device and a further control signal from a further sensor device define colliding settings. For example in case two sensor devices are activated in one room, one of the sensor devices defining the light to be suitable for being romantic and the other one defining light suitable to clean the room, the arbiter such as an arbiter function realized via the controller or the processor will have to decide what to do.

According to a third aspect of the invention, a sensing method is provided. The sensing method is defined by comprising the steps of repeatedly generating trigger signals, detecting a light parameter of light at a location, and in response to a trigger signal, transmitting a control signal based on a detection to a control device for controlling a light source to influence the light at the location.

According to a fourth aspect of the invention, a computer program product is provided for performing the steps of the method.

According to a fifth aspect of the invention, a medium is provided for storing and comprising the computer program product.

Embodiments of the method and the computer program product and the medium correspond with the embodiments of the sensor device and the control device.

An insight might be that the sensor device and the control device should act relatively independent from a user.

A basic idea might be that a sensor device should be provided with a trigger signal generator, a light detector and a transmitter, and a control device should be provided with a receiver and a controller and at least one of four parts.

A problem to provide a relatively automatic sensor device and a relatively automatic control device is solved. An advantage might be that the sensor device and the control device can be simple, robust and low cost.

These and other aspects of the invention are apparent from and will be elucidated with reference to the embodiment(s) described hereinafter.

BRIEF DESCRIPTION OF THE DRAWINGS

In the drawings:

FIG. 1 shows an embodiment of a sensor device and an embodiment of a control device.

DETAILED DESCRIPTION OF EMBODIMENTS

In the FIG. 1, an embodiment of a sensor device 1 and an embodiment of a control device 20 are shown. The sensor device 1 comprises a trigger signal generator 2 for repeatedly generating trigger signals, a light detector 12 for, in response to a trigger signal or independently from the trigger signal, detecting a light parameter of light 43 at a location, and a transmitter 9 for, in response to a trigger signal, transmitting a control signal to a control device 20 via a wired (electrical wire, fiber) or wireless (radio-frequency, optical, infrared) coupling indicated by the arrows 13 and 30 for controlling a light source 40 to influence the light 43 at the location. The light 43 may alternatively comprise light from different light sources and/or additional light from the sun.

Preferably, the sensor device 1 is a mobile sensor device to be used temporarily at the location, the light 43 at the location is light 43 at the light detector 12, and the light parameter comprises an intensity and/or a color and/or a color temperature and/or a pattern and/or a fluctuation of the light 43. The control signal may comprise light parameter information defining the detected light parameter to purely inform the control device 20 or to set the control device 20. The sensor device 1 may get its power from a power source 7 such as a non-chargeable battery or a chargeable battery or a solar cell or any other kind of power source. The trigger signal generator 2 may be a clock signal generator or another signal generator. The repeated trigger signals may be repeated per fixed time-interval or flexible time-interval, whereby a time-interval may depend on the actual time or another time or on the environment or on other data. The trigger signal generator may itself be triggered via an internal signal or an external signal, such as an incoming radio-frequency signal that may or may not be converted into power and that may or may not be a modulated or individualized or coded radio-frequency signal, or such as an incoming optical signal that may or may not be a modulated or individualized or coded optical signal etc. The light detector 12 may be a light dependent resistor or a solar cell or another light detector. The transmitter 9 may be a wireless transmitter using radio signals (for example Zigbee signals) or optical signals or may be a wired transmitter using a wire, which wire might be used for further purposes such as power supply to avoid or charge the power source 7.

The sensor device 1 may further comprise a theme code generator 3 for generating a theme code, which theme code may be supplied to the control device 20 via or as a part of the control signal. The theme code defines a theme such as for example working, reading, relaxing, watching television, listening to the radio, being romantic, cleaning etc. (activity themes) or blue, green, red, dark, light, snow, desert, sea, autumn etc. (scenery themes) and may be either fixed or adjustable via for example a man-machine-interface or a mixture of both (pre-set+adjustable). In case of the theme code being a fixed theme code, the form and looks of the sensor device 1 may indicate the theme defined by this fixed theme code to a user.

The sensor device 1 may further comprise a location code generator 4 for generating a location code, which location code may be supplied to the control device 20 via or as a part of the control signal. The location code may be calculated in the sensor device 1 at the hand of for example positioning system technology or mobile radio technology or an indication code originating from the control device 20 and to be received via a further receiver 11 via a wired (electrical wire, fiber) or wireless (radio-frequency, optical, infrared) coupling indicated by the arrows 15 and 32 (alternatively, the indication code may be provided via the light 43 and might then be detected via the detector 12 or the further receiver 11) or may be calculated outside the sensor device 1 and then supplied to the sensor device 1. Alternatively, the location code may for example be selected or entered by the user, for example via a man-machine-interface. Alternatively, the location code may for example be an indicative location code in the form of a fixed location code for a sensor device 1 that is designed to be used at a particular location.

The sensor device 1 may further comprise a processor 5 for, in response to a detection, calculating a setting for the control device 20, which setting may be supplied to the control device 20 via or as a part of the control signal. To be able to calculate the setting, the sensor device 1 must have knowledge about the position of the light source 40. Such knowledge might be pre-stored in a memory not shown that forms part of or is coupled to the processor 5.

The sensor device 1 may further comprise a scanner 10 for scanning an environment for available light sources. Via the scanner 10, the knowledge about the position of the light source 40 no longer needs to be pre-stored in the memory but may be retrieved on the fly. The scanner 10 may receive scanning information from the control device 20 and/or the available and/or reachable light sources 40. Alternatively the scanner 10 may send scanning requests to and receive scanning responses from the control device 20 and/or the available and/or reachable light sources 40. In this case the scanner 10 communicates bi-directionally with the control device 20 via a wired (electrical wire, fiber) or wireless (radio-frequency, optical, infrared) coupling indicated by the arrows 14 and 31. Alternatively the scanner 10 may scan the environment through tests and/or trial & error (what happens if for example a first light source is ordered to increase its intensity by for example 10% and a second light source is ordered to decrease its intensity by for example 10%) etc. In this case, the scanner 10 and the light detector 12 may have an overlapping part or may be entirely combined into one unit, and/or the scanner 10 and the transmitter 9 may have an overlapping part or may be entirely combined into one unit.

The sensor device 1 may further comprise a position detector 6 for activating and deactivating the transmitter 9 in dependence of a position of the sensor device 1. The sensor device 1 may for example be in the form of a match box or a cube etc. In a first position it functions as a sensor device 1 and in a second position such as up-side-down it does not function as a sensor device but only functions for example as an eye catcher.

The control device 20 controls the light source 40 to influence the light 43 at the location and comprises a receiver 27 for receiving the control signal from the sensor device 1 and a controller 26 for, in response to the control signal, controlling the light source 40. Thereto, the controller 26 is for example coupled to an electrical and/or mechanical interface 42 of the light source 40. This interface 42 is for example coupled to a generator 41 such as one or more light emitting diodes or gas discharge lamps or incandescent lamps etc. for producing the light 43. Alternatively, the control device 20 may control the light source 40 wirelessly, and/or the interface 42 may be a wireless interface.

The control device 20 further comprises at least one of four parts. A first part may comprise a theme code detector 21 for detecting the theme code as received from the sensor device 1 and may comprise a processor 22 for, in response to a detection, calculating a setting for the light source 40. A second part may comprise a location code detector 23 for detecting the location code as received from the sensor device 1 and may comprise the processor 22 for, in response to a detection, calculating a setting for the light source 40. A third part may comprise a setting detector 24 for detecting the setting for the light source 40 as received from the sensor device 1. A fourth part may comprise a communicator 28 for communication with the scanner 10 of the sensor device 1. Such a communicator 28 may send scanning information to the sensor device 1. Alternatively the communicator 28 may receive scanning requests from and send scanning responses to the sensor device 1.

Preferably, the control signal comprises light parameter information defining the light parameter detected by the sensor device 1, which light parameter may be an intensity and/or a color and/or a color temperature and/or a pattern and/or a fluctuation of the light 43. The control device 20 may further comprise a transmitter 29 for transmitting the indication code to the sensor device 1, alternatively this may be realized via for example the interface 42 and the generator 41 and the light 43, whereby the interface 42 and the generator 41 function as the transmitter 29. The control device 20 may further comprise an arbiter 25 for making a decision in case the control signal from the sensor device 1 and a further control signal from a further sensor device define colliding settings. For example in case two sensor devices are activated in one room, and one of the sensor devices defines the light to be suitable for being romantic and the other one defines light suitable to clean the room, the arbiter 25 such as an arbiter function realized via the controller 26 or the processor 22 will have to decide what to do.

The control device 20 and the light source 40 might further comprise their own power source not shown or a mutual power source not shown or might further be coupled to their own power source not shown or to a mutual power source not shown.

In each block shown, different parts may be integrated and/or combined without departing from the scope of this invention. For example in the sensor device 1, the controller 8 and the processor 5 might be combined, and each detector might be realized via the processor 5 etc. For example in the control device 20, the controller 26 and the processor 22 might be combined, and each detector might be realized via the processor 22 etc. Each sensor device may communicate with one or more control devices, and two or more sensor devices may communicate with the same control device, and each control device may control one or more light sources, and two or more control devices may control the same light source, whereby arbiter functions and/or priority functions might be needed to avoid and/or solve collisions.

In other words, the solution introduces new sensor and control devices. The sensor device contains a light sensor and communication functionality to communicate preferably wirelessly with the control device in a room.

In a first concept the sensor device is extremely low cost and robust. Each sensor device may have a fixed activity and/or theme. The actual control mechanism is not located in the sensor device. For example for a reading scenario, when a user wants to read a newspaper, he/she puts the sensor device next to the newspaper at the table.

The sensor device measures the light intensity and color at the desired location, and sends measured values and/or goal values via the communication mechanism to the control device. The control device might measure a location of the sensor device via the communication mechanism and will calculate new values and adjusts various light outputs to match the goal. The sensor device measures the new values and the cycle is repeated.

The sensor device may have a fun shape and color, intuitively showing its goal (for example reading). The sensor device may be only operable when the sensor device is up. Turning the sensor device up-side-down will disable the sensor device. The sensor device is able to work with a centrally controlled system or with a distributed (modular) system.

In a second concept, the sensor device has a light sensor, but also for example a user interface to set desired light values. In this concept the sensor device not only measures light values, but also calculates and controls the light sources in this environment. The sensor device measures the light intensity and color at the desired location. The sensor device scans the environment for the available light sources and determines their type and location. The sensor device calculates and sends new settings for the lights sources to adjust the light intensity. The light sources receive the new settings and change the light output. The sensor device starts the cycle again.

The sensor device may fit best to a distributed (modular) system but is also capable to cooperate with a centrally controlled system. The used technology may be based on existing light sensors, existing communication protocols developed to control light sources, the skin of the sensor device is made of a soft material (plastic) and the sensor device can be powered with a battery and a solar cell.

This invention can be building block of a (future) modular light system, consisting of multiple light sources, which is centrally or distributed controlled.

The concepts can be used in the professional and consumer market. The solution provides higher comfort for a user, because a light intensity can be controlled with a simple mechanism, a user friendly mechanism (which is a big challenge for (complex) light systems), energy saving, and various sensor devices may be sold with different light goals, light presets and colors, device looks and appearances.

Summarizing, sensor devices 1 are provided with trigger signal generators 2 for repeatedly generating trigger signals and light detectors 12 for detecting light parameters such as intensities and colors and color temperatures and patterns and fluctuations of light 43 at a location and transmitters 9 for, in response to trigger signals, transmitting control signals based on detections to control devices 20 for controlling light sources 40 to influence the light 43 at the location. The sensor devices 1 may further comprise theme code generators 3, location code generators 4, processors 5, scanners 10, and position detectors 6. The control devices 20 comprise receivers 27 for receiving the control signals from the sensor devices 1 and controllers 26 for, in response to the control signals, controlling the light sources 40 and may further comprise theme code detectors 21 and/or processors 22 and/or location code detectors 23 and/or setting detectors 24 and/or communicators 28 for communication with scanners 10 and/or transmitters 29 and/or arbiters 25.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A mobile sensor device comprising
a trigger signal generator initiated by a clock signal generator of a processor for repeatedly generating trigger signals,
a light detector for detecting at least one light parameter of light at a location,
a processor arranged to, in response to the detection of light, calculate a setting for a control device for controlling a light source to influence the light at the location,
a location code generator for generating a location code for the mobile sensor device, the control signal including the location code;

a transmitter for, in response to a trigger signal, transmitting a control signal including the location code to the control device for controlling a light source to influence the light at the location; and wherein the mobile sensor device further includes a position detector operable to activate and deactivate the transmitter, the position detector operable to sense the mobile sensor device is positioned in an upside down orientation thereby deactivating the transmitter.

2. The sensor device as claimed in claim 1, wherein the light parameter is an intensity and/or a color and/or a color temperature and/or a pattern and/or a fluctuation of the light.

3. The sensor device as claimed in claim 1, wherein the control signal comprises light parameter information defining the detected light parameter.

4. The sensor device as claimed in claim 1, further comprising a theme code generator for generating a theme code, the control signal comprising the theme code, the theme code being a fixed theme.

5. The sensor device as claimed in claim 1, further comprising the processor including the clock signal generator.

6. The sensor device as claimed in claim 1, further including a scanner wherein the scanner is a passive scanner that receives scanning information from the control device and/or the available light sources and/or reachable light sources.

7. A sensing method implemented by a sensor device comprising the steps of scanning an environment by a scanner for available light sources, repeatedly automatically generating trigger signals by an automated trigger signal generator, detecting a light parameter of light and an identified location, in response to a trigger signal, transmitting a control signal by a transmitter based on a detection to a control device for controlling a light source to influence the light at the identified location, and deactivating the transmitter when a position detector detects that the sensor device is in an upside down orientation.

8. A portable sensor device for temporary use at a location within an environment to act automatically and independent of a user, the sensor device comprising:

a scanner for scanning the environment for available light sources, the scanner comprising an active scanner configured for sending scanning requests to and receiving scanning responses from one or more target devices in the environment;

a trigger signal generator associated with a clock signal of a processor for repeatedly generating trigger signals, a light detector for detecting at least one light parameter of light at the location, a location code generator enabled to generate a location code as part of a positioning system, the control signal modified to include the location code, a transmitter for, in response to a trigger signal, transmitting a control signal based on a detection to a control device for controlling a light source to influence the light at the location, a processor for, in response to a detection, calculating a setting for the control device, the control signal comprising the setting, and the portable sensor device further having a position detector operable to activate and deactivate the transmitter, the position detector deactivating the transmitter when it senses the portable sensor device in an upside down orientation.

* * * * *